United States Patent

[11] 3,550,617

| [72] | Inventor | Howard L. Johnson<br>Will County, Ill. |
| --- | --- | --- |
| [21] | Appl. No. | 763,502 |
| [22] | Filed | Sept. 30, 1968 |
| [45] | Patented | Dec. 29, 1970 |
| [73] | Assignee | Caterpillar Tractor Co.<br>Peoria, Ill.<br>a corporation of Illinois |

[54] RELIEF VALVE WITH CONTROLLED STABILITY AND VARIABLE SETTING
1 Claim, 1 Drawing Fig.

| [52] | U.S. Cl. | 137/514.5, 137/540 |
| --- | --- | --- |
| [51] | Int. Cl. | F16k 15/02 |
| [50] | Field of Search | 137/514.5, 514.7 |

[56] References Cited
UNITED STATES PATENTS

| 2,987,309 | 6/1961 | Biggle | 137/505.41X |
| --- | --- | --- | --- |
| 2,318,963 | 5/1943 | Parker | 137/514.7 |
| 2,352,322 | 6/1944 | Hoffer | 137/514.5 |
| 2,541,395 | 2/1951 | Wilson | 137/514.5 |
| 3,154,095 | 10/1964 | Cleminshaw et al. | 137/514.5X |
| 3,361,151 | 1/1968 | VanHouse | 137/514.5X |

*Primary Examiner*—Robert G. Nilson
*Attorney*—Fryer, Tjensvold, Feix, Phillips & Lempio ABSTRACT: A relief valve of the spring-loaded check type with means for damping both the opening and closing action of the valve to prevent hammering and chattering, and means to vary the preload of the valve spring at will, when the purpose for which it is to be used changes.

TO CONTROLLED CIRCUIT

PATENTED DEC 29 1970
3,550,617
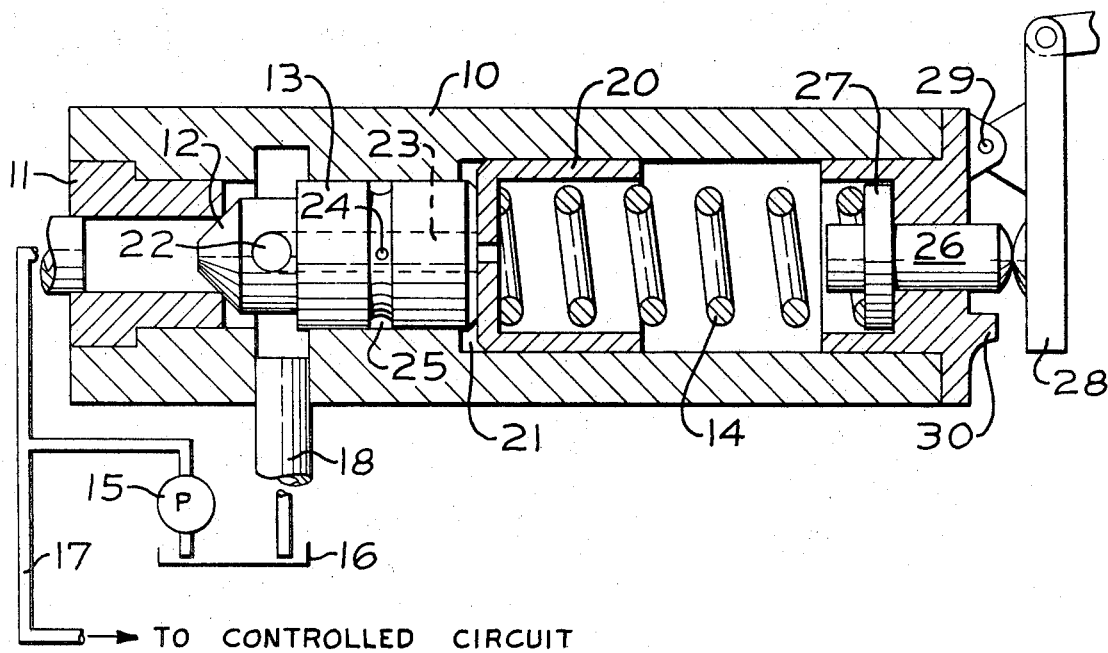
INVENTOR
HOWARD L. JOHNSON
BY
Fryer, Tjensvold, Feix, Phillips & Lempio
ATTORNEYS

RELIEF VALVE WITH CONTROLLED STABILITY AND VARIABLE SETTING

Hammering and chattering of a relief valve, in many environments, has caused annoyance and even damage to components of the circuit in which the valves are used. The present invention overcomes these difficulties by the provision of a poppet-type valve with a single damping means operable to stabilize the action of the valve in both opening and closing movements. The valve is also constructed to enable the use of very simple mechanisms for increasing the preload on its spring and thus adjusting it for use in two entirely different capacities. An example of a need for this type of mechanism is found in the motor grader field where a hydraulic circuit is employed for raising and lowering of the grader blade, as well as for other adjustments of the blade and other components.

The power available to lower the blade is sufficient to raise the forward end of the machine and its wheels, or one set of rear tandem wheels off the ground depending on the location of the blade. Since this is ordinarily undesirable, a relief valve in the circuit opens before such conditions occur. On occasion, however, it is desirable to change a tire or to lift the wheels from a bog or the like. With the relief valve of the present invention, it is within the power of the machine operator to increase the preload on the valve spring and thus develop temporary pressure in the system sufficient to accomplish these unusual functions.

The construction and operation of the valve of the present invention will best be understood upon reading the following Specification wherein the invention is described in detail by reference to the accompanying drawing.

The drawing is a cross-sectional view of a valve embodying the present invention shown schematically together with a schematic illustration of that portion of a circuit necessary to an understanding of the operation of the valve.

The valve shown in the drawing has a body 10 with a valve seat 11 in one end closed by a poppet valve 12, which is formed as a part of a cylinder 13, guided for reciprocal action in a suitable bore formed in the valve body. A spring 14 urges the cylinder 13 and valve seat toward the closed position shown. A pump 15 directs fluid from a reservoir 16 through a line 17 which forms a part of a circuit used to control a machine component—for example, the blade of the motor grader. When a pressure valve in the circuit is reached just slightly in excess of that necessary to perform the ordinary functions of raising and lowering the blade, the valve 12 opens against the force of the spring 14 and fluid is relieved to the reservoir by way of a line 18.

In order to cushion the movement of the valve 12 in both directions, thus preventing chattering and hammering, the spring 14 is seated in a cup-shaped spring seat 20 which bears against the inner end of the cylinder 13. Immediately upon opening of the valve 12, an annular space shown at 21 is enlarged because the cup-shaped spring seat 20 is larger in diameter than the cylinder 13. This creates a tendency toward a vacuum which adds to the force of the spring 14 and causes the valve to open slowly. As it opens, the negative pressure condition in the annular space or chamber 21 causes a flow of fluid through a cross port 22 in the valve and a longitudinal port or passageway 23. Some of this fluid flows through a smaller cross port 24 into an annulus 25 and can leak through the clearance between the cylinder 13 and its bore to the annular space 21. Fluid may also escape to such space from between the abutting ends of the cylinders 13 and 20 so that, as the valve is slowly opened, the vacuum will be relieved and the space will filled with hydraulic fluid. One of the big advantages of this retarding mechanism is that it operates upon motion of the valve in both opening and closing directions. This is true because of the fact that when the pressure in the system falls to a point which permits the valve to close, it is necessary for the spring to move the valve in opposition to the fluid in the space 21 and, since this fluid must flow back into the system through the severely restricted spaces just described, the closing motion is retarded.

When it is desirable to accomplish some of the unusual functions of the system in which a higher than normal pressure is required a plunger 26, which has a collar 27 forming a seat for one end of the spring 14, is urged leftwardly to compress the spring, thus increasing its preload and demanding greater pressure in the system to open the valve. This plunger is contacted at its outer end by a lever 28 pivoted at 29 and adapted to be actuated, by a suitable linkage not shown communicating with the operator's station, to swing about its pivot and press the plunger inwardly. The preload on the spring can be predetermined by suitable stop means such as a boss 30 on the valve which limits the swinging motion of the lever 28. Thus, the requirements of high pressure which occur at infrequent intervals can be met without imposing on the circuit the necessity of confining pressures in excess of the requirements for its ordinary functions.

I claim:

1. A relief valve having a seat, a valve element movable to and from the seat, a housing with a cylindrical bore, a cylinder slidable in the bore and secured to the valve element for movement therewith, a cylindrical spring chamber of greater diameter than and communicating with the bore, a spring in the chamber urging the cylinder and valve toward a closed position, a spring seat slidable in the spring chamber and abutting the cylinder in the bore forming a variable volume annular chamber surrounding the cylinder in the spring chamber, and means comprising a passageway in said cylinder, and an annular space between said cylinder and said bore for permitting restricted flow of valved fluid into said annular chamber to damp the opening of the valve.